US010286768B2

(12) United States Patent
Ogawa et al.

(10) Patent No.: US 10,286,768 B2
(45) Date of Patent: May 14, 2019

(54) INNER WEATHER STRIP AND SEAL STRUCTURE OF VEHICLE DOOR

(71) Applicants: TOKAI KOGYO CO., LTD., Obu-shi, Aichi (JP); HONDA MOTOR CO., LTD., Tokyo (JP)

(72) Inventors: Atsushi Ogawa, Obu (JP); Takanori Usui, Wako (JP)

(73) Assignees: TOKAI KOGYO CO., LTD., Obu (JP); HONDA MOTOR CO., LTD., Tokyo (JP)

( * ) Notice: Subject to any disclaimer, the term of this patent is extended or adjusted under 35 U.S.C. 154(b) by 130 days.

(21) Appl. No.: 15/434,368

(22) Filed: Feb. 16, 2017

(65) Prior Publication Data

US 2017/0232827 A1   Aug. 17, 2017

(30) Foreign Application Priority Data

Feb. 17, 2016  (JP) .................................. 2016-028025
Feb. 7, 2017  (JP) .................................. 2017-020258

(51) Int. Cl.
*B60J 10/75* (2016.01)
(52) U.S. Cl.
CPC ..................... *B60J 10/75* (2016.02)
(58) Field of Classification Search
CPC ....................................................... B60J 10/75
See application file for complete search history.

(56) References Cited

U.S. PATENT DOCUMENTS

| 4,817,336 | A | * | 4/1989 | Kisanuki | B60J 10/21 296/154 |
| 4,894,954 | A | * | 1/1990 | Nozaki | B60J 10/235 49/373 |
| 5,561,003 | A | * | 10/1996 | Nowosiadly | B60R 13/0206 296/93 |
| 6,070,364 | A | * | 6/2000 | Berry | B60J 10/235 49/441 |
| 6,119,404 | A | * | 9/2000 | Bschorr | B60J 10/00 49/490.1 |
| 6,119,406 | A | * | 9/2000 | Gulisano | B60J 10/265 296/146.5 |
| 6,401,394 | B2 | * | 6/2002 | Nozaki | B60J 10/18 49/377 |

(Continued)

FOREIGN PATENT DOCUMENTS

FR   2583359 A1 * 12/1986 ............... B60J 1/17
JP   2004-074830 A   3/2004

*Primary Examiner* — Catherine A Kelly
(74) *Attorney, Agent, or Firm* — Oliff PLC

(57) ABSTRACT

An inner weather strip including: a main body part including at least an exterior lateral wall and a top wall; a seal lip provided on an outer surface of the exterior lateral wall; and a top wall lip provided on an outer surface of the top wall, wherein at least one longitudinal direction end portion of the inner weather strip is provided with an end surface wall, and wherein the end surface wall has a size equal to or larger than a size of an area surrounded by: the seal lip; the main body part; the top wall lip; and a line connecting a tip end of the seal lip and a tip end of the top wall lip, and has a joining part at which the end surface wall and at least a part of an longitudinal direction end surface of the top wall lip are integrally joined.

11 Claims, 10 Drawing Sheets

(56) References Cited

U.S. PATENT DOCUMENTS

| | | | | |
|---|---|---|---|---|
| 6,502,832 B2* | 1/2003 | Goto | ................... | F16J 15/025 |
| | | | | 277/642 |
| 6,966,601 B2* | 11/2005 | Matsumoto | ......... | B60R 13/0206 |
| | | | | 296/146.2 |
| 7,536,830 B2* | 5/2009 | Clark | ................. | B60J 10/32 |
| | | | | 296/146.7 |
| 9,027,982 B2* | 5/2015 | Ide | ................. | B60J 5/0402 |
| | | | | 296/146.2 |
| 9,038,318 B2* | 5/2015 | Jendrossek | ............ | B60J 10/041 |
| | | | | 49/377 |
| 9,434,242 B2* | 9/2016 | Yamada | .............. | B60J 10/75 |
| 9,481,322 B2* | 11/2016 | Jeon | ................. | B60R 13/0243 |
| 2004/0094989 A1* | 5/2004 | Matsumoto | ......... | B60R 13/0206 |
| | | | | 296/146.1 |
| 2004/0104542 A1* | 6/2004 | Kobayashi | ............ | B60J 10/16 |
| | | | | 277/640 |
| 2017/0225553 A1* | 8/2017 | Masumoto | .............. | B60J 10/76 |

\* cited by examiner

INNER WEATHER STRIP AND SEAL STRUCTURE OF VEHICLE DOOR

CROSS-REFERENCE TO RELATED APPLICATIONS

This application claims priority from Japanese Patent Application No. 2016-028025 filed on Feb. 17, 2016, and Japanese Patent Application No. 2017-020258 filed on Feb. 7, 2017, the entire contents of which are incorporated herein by reference.

TECHNICAL FIELD

The disclosure relates to an inner weather strip which configured to be mounted to an interior beltline of a vehicle door, and a seal structure.

BACKGROUND

In general, a vehicle door representative of a vehicle includes an door outer panel at an exterior side and an door inner panel at an interior side, which are arranged to face each other with a window plate (window glass) being interposed therebetween, and a decorative door trim is arranged at the interior side of the door inner panel. A weather strip serving as a seal material is arranged at a beltline along a lower edge of a window opening edge of the door, and a glass run channel is arranged at the other window opening edges. The weather strip includes an outer weather strip, which is mounted to an upper edge flange of the door outer panel, and an inner weather strip, which is mounted to an upper edge flange of the door inner panel. The glass run channel is arranged along the window opening edge, and has an upper edge portion configured to accommodate therein the window plate having moved up and a window plate guide part extending in an upper and lower direction along an up-and-down locus of both edges of the window plate so as to guide an up-and-down operation of the window plate.

The door outer panel is provided at its lower part with an opening (drain hole) for discharging rain and the like, which flows into the door from a region between the door outer panel and the window plate, to an outside of the door. Also, the door inner panel is provided with an opening for mounting therein a door handle, a window regulator and the like. For this reason, an exterior noise such as a road noise, a wind noise and the like during traveling is introduced into the door through the door outer panel itself, particularly the lower opening, so that a passenger in a vehicle interior may hear the exterior noise.

As routes through which the exterior noise introduced into the door is introduced into the vehicle interior, three routes can be representatively exemplified, as follows.

First route: A route through which the exterior noise passes through the opening provided in the door inner panel and through the door trim to be introduced into the vehicle interior.

Second route: A route through which the exterior noise passes through a gap between the window plate and the door inner panel to be introduced into the vehicle interior.

Third route: A route through which the exterior noise passes through the opening provided in the door inner panel and passes a gap between the door inner panel and the door trim to be introduced into the vehicle interior from a gap between the inner weather strip and the door trim.

Therefore, as a sound insulation means for the exterior noise which passes through the above-described routes, generally, the following measures have been taken. Regarding the first route, the door trim is provided with a sound-absorbing material. Regarding the second route, the inner weather strip mounted to the door inner panel is provided with a seal lip, and the seal lip is elastically contacted to the window plate to block the gap. Regarding the third route, the inner weather strip mounted to the door inner panel is provided with a top wall lip, and the top wall lip is elastically contacted to the door trim to block the gap.

For example, JP-A-2004-74830 discloses an inner weather strip that is to be used for the measures of the second and third routes. The inner weather strip is a long member that is mounted to the interior beltline of the vehicle door having the window plate. At a state where the inner weather strip is mounted to the beltline, both longitudinal direction end portions of the inner weather strip is in contact with the glass run channel, which is mounted in the upper and lower direction along the up-and-down locus of both edges of the window plate so as to guide an up-and-down operation of the window plate. Specifically, the inner weather strip has a main body part having an exterior lateral wall and an interior lateral wall, which are arranged to face each other with a predetermined interval, and a top wall integrally connecting upper edges of both lateral walls. Also, an outer surface of the exterior lateral wall is provided with an upper seal lip and a lower seal lip, each of which having a pleat shape and elastically contacting the window plate. The upper seal lip and the lower seal lip extends between both longitudinal direction end portions of the exterior lateral wall. Also, an outer surface of the top wall is provided with a top wall lip, which has a pleat shape and elastically contacts the door trim. The top wall lip extends between both longitudinal direction end portions of the top wall.

SUMMARY

However, according to the above-described inner weather strip, the following problems occur when the exterior noise introduced into the vehicle interior through the second route. That is, at the state where the inner weather strip is mounted to the door inner panel, both longitudinal direction end portions of the inner weather strip is in contact with the glass run channel. However, dimensional variations are inevitably caused in the inner weather strip and the glass run channel upon the manufacturing. Also, when mounting the inner weather strip and the glass run channel, mounting variations may be caused. In this case, a contact angle between the inner weather strip and the glass run channel is changed due to the variations. Regarding these problems, JP-A-2004-74830 discloses a structure where end surfaces of the thin and pleat shaped seal lip and top wall lip are merely in contact with the glass run channel at both longitudinal direction end portions of the inner weather strip. According to this structure, the seal lip and the top wall lip cannot follow the change in the contact angle between the inner weather strip and the glass run channel, which is caused due to the variations, so that a gap may be formed at the contact part between the inner weather strip and the glass run channel. As a result, the exterior noise is introduced into the vehicle interior from the gap.

Also, the top wall lip is made of an elastic material (for example, soft thermoplastic elastomer or rubber) more flexible than the main body part so as to elastically contact the door trim. However, since the top wall lip has a thin pleat shape, a shape retaining force is lower at both longitudinal direction end portions, as compared to the other portions, and a position of a tip end thereof is unstable. Therefore, when the top wall lip is elastically contacted to the door trim, both longitudinal direction end portions of the top wall lip contacts with the door trim at different positions and angles as compared to the other portions, so that the tip end of the top wall lip may be bent towards a root-side at both longitudinal direction end portions. In this case, a gap is also formed between both longitudinal direction end portions of the top wall lip and the door trim. Also, the shape retaining force is lower and the elastic contact pressure (seal pressure) with the door trim are also weakened at both longitudinal direction end portions of the top wall lip as compared to the other portions. Therefore, the gap is likely to be formed between both longitudinal direction end portions of the top wall lip and the door trim also for this reason. As a result, the exterior noise is introduced into the vehicle interior through the third route.

Aspects of the disclosure provides an inner weather strip and a seal structure of a vehicle door, in which a gap is difficult to be formed between a glass run channel and a door trim when the inner weather strip is mounted to a beltline of a vehicle door.

According to an aspect of the disclosure, there is provided a long inner weather strip extending in a longitudinal direction, configured to be mounted to an interior beltline of a vehicle door having a window plate, and having at least one longitudinal direction end portion which is configured to contact with a glass run channel mounted to the vehicle door, the inner weather strip including: a main body part including at least an exterior lateral wall and a top wall integrally connected to an upper edge of the exterior lateral wall; at least one seal lip provided on an outer surface of the exterior lateral wall and configured to elastically contact the window plate; and a top wall lip provided on an outer surface of the top wall and configured to elastically contact a door trim, wherein the main body part, the at least one seal lip, and the top wall lip extends in the longitudinal direction from one longitudinal direction end portion of the inner weather strip to another longitudinal direction end portion of the inner weather strip, wherein the at least one longitudinal direction end portion of the inner weather strip is provided with an end surface wall which extends in a direction intersecting with the longitudinal direction, and wherein the end surface wall has a size equal to or larger than a size of an area surrounded by: an uppermost seal lip among the at least one seal lip; the main body part; the top wall lip; and a line connecting a tip end of the seal lip and a tip end of the top wall lip, and has a joining part at which the end surface wall and at least a part of an longitudinal direction end surface of the top wall lip are integrally joined to each other.

According to another aspect of the disclosure, there is provided a seal structure of a vehicle door in which the above-described inner weather strip is mounted to the interior beltline of the vehicle door, the glass run channel is mounted in an upper and lower direction along an up-and-down locus of both side edges of the window plate so as to guide an up-and-down operation of the window plate, and the at least one longitudinal direction end portion of the inner weather strip is in contact with the glass run channel.

DETAILED DESCRIPTION

First Illustrative Embodiment

Figure 1:
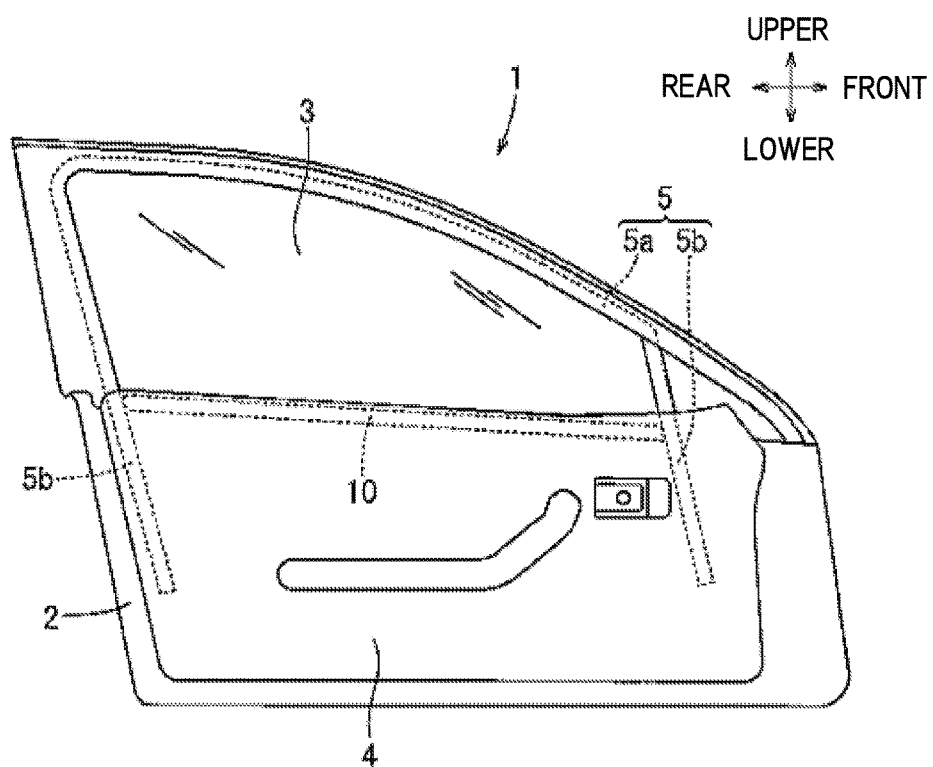
FIG. 1 is a side view of a vehicle door.

First, a vehicle door to which the disclosure is to be applied will be described. As the vehicle door, a side door of a vehicle can be representatively exemplified. As shown in FIG. 1, a door 1 includes a door outer panel of an exterior side and a door inner panel 2 of an interior side, which are arranged to face each other, and a window plate (window glass) 3 is interposed therebetween so as to move up and down. A decorative door trim 4 is additionally arranged at the interior side of the door inner panel 2. The door outer panel and the door inner panel 2 are made of metal, and the door trim 4 is made of a resin. Also, a long weather strip serving as a seal material is arranged at a beltline along a lower edge of a window opening edge of the door 1, and a long glass run channel 5 serving as a seal material is arranged at other window opening edges.

Figure 2:
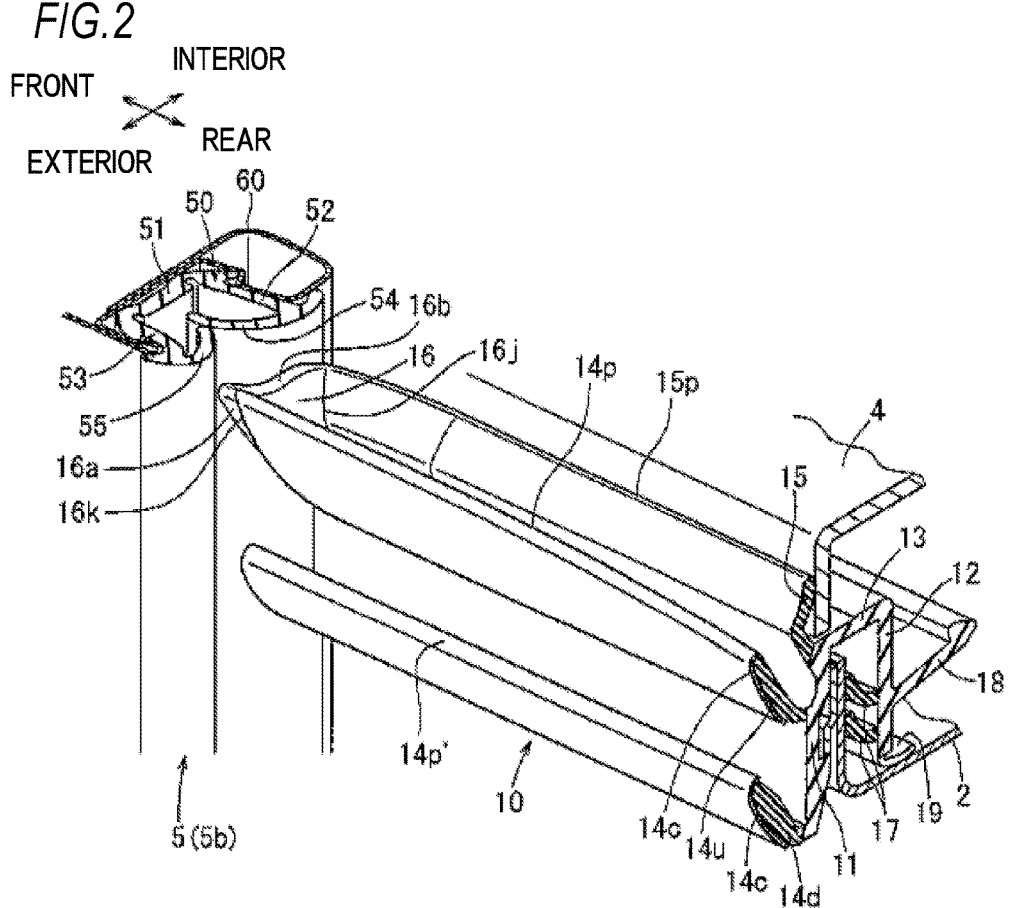
FIG. 2 is a perspective view depicting a contact state between an inner weather strip of a first illustrative embodiment and a glass run channel.
Figure 3:
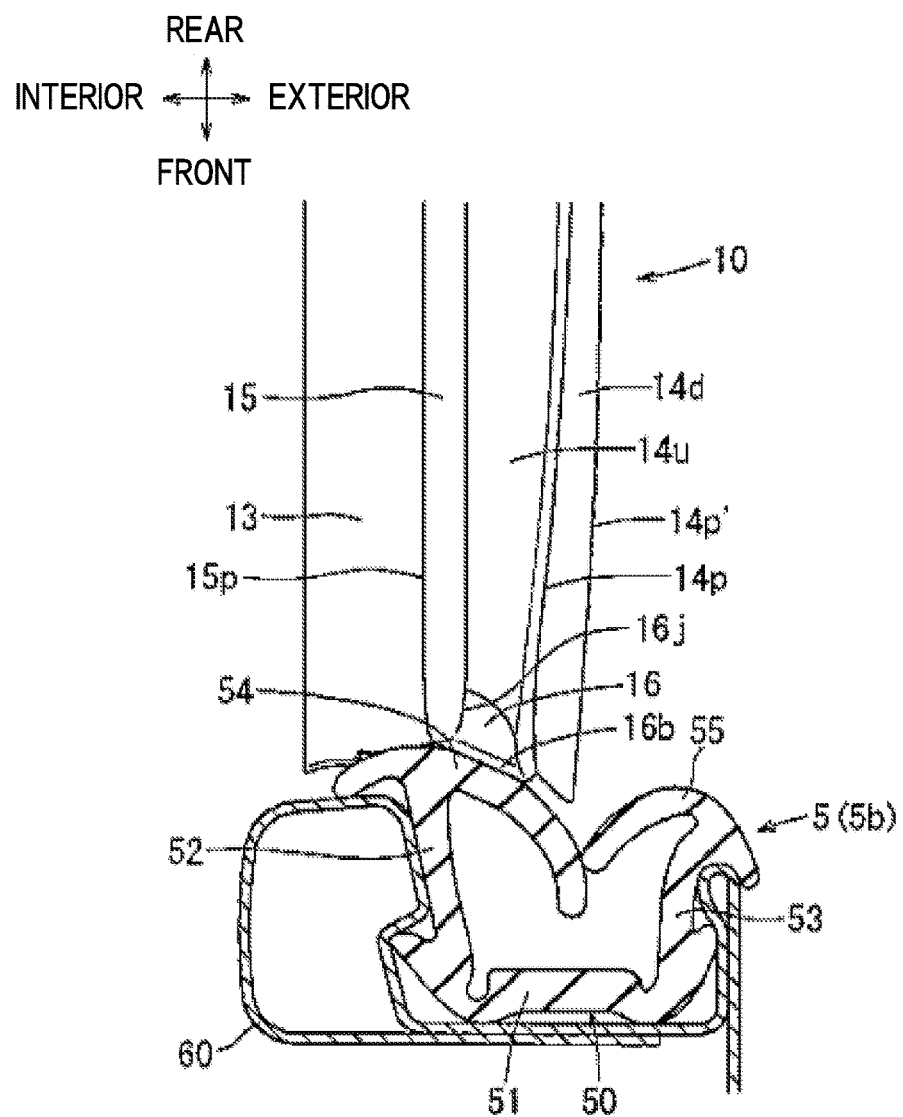
FIG. 3 is a plan view of FIG. 2.

The glass run channel 5 is arranged along the window opening edge and has a peripheral edge portion 5a that accommodates therein the window plate 3 having moved up and window plate guide parts 5b extending in an upper and lower direction along an up-and-down locus of both edges of the window plate 3 so as to guide an up-and-down operation of the window plate 3. The weather strip includes an outer weather strip, which is mounted to an upper edge flange of the door outer panel, and an inner weather strip 10, which is mounted to an upper edge flange 2a (refer to FIG. 4 and the like) of the door inner panel 2. As shown in FIGS. 1 to 3, at a state where the glass run channel 5 and the inner weather strip 10 are mounted to the door 1, at least one longitudinal direction end (a front end in a front and rear direction of the vehicle, in the first illustrative embodiment) of the inner weather strip 10, normally, both ends are preferably contacted to the window plate guide parts 5b of the glass run channel 5. Here, the longitudinal direction is a front and rear direction of the vehicle. Meanwhile, in FIGS. 2 and 3, although a circumference of an end portion of the inner weather strip 10 arranged at a front side of the vehicle is shown, the window plate 3 is not shown (FIGS. 5, 6, 8 and 9, which will be described later, are also the same).

The glass run channel 5 has a basic shape which is substantially uniform between both longitudinal direction end portions. As shown in FIGS. 2 and 3, the glass run channel 5 has a holding part 50 having a substantially U-shaped section and configured by a bottom wall 51 and an interior lateral wall 52 and an exterior lateral wall 53 provided upright from both ends of the bottom wall 51. Holding lips 54, 55 each of which has a pleat shape and elastically contacting the window plate 3 protrude inwards from tip end edges of the interior lateral wall 52 and the exterior lateral wall 53 so as to face each other. The glass run channel 5 is mounted to a door frame 60, and the window plate 3 is moved up and down in the holding part 50 with both edges (side edges in the front and rear direction of the vehicle) being elastically contacted and held by the holding lips 54, 55 (not shown).

The glass run channel 5 is made of an elastically deformable polymer material such as rubber, thermoplastic resin, thermoplastic elastomer or the like, and is manufactured by extrusion molding. In the meantime, the glass run channel 5 may be entirely formed of the same material or may be partially formed of a different polymer material. For example, the holding part 50 may be formed of thermoplastic elastomer and the holding lips 54, 55 may be formed of foamed rubber. Also, a covering layer may be partially provided.

Figure 4:
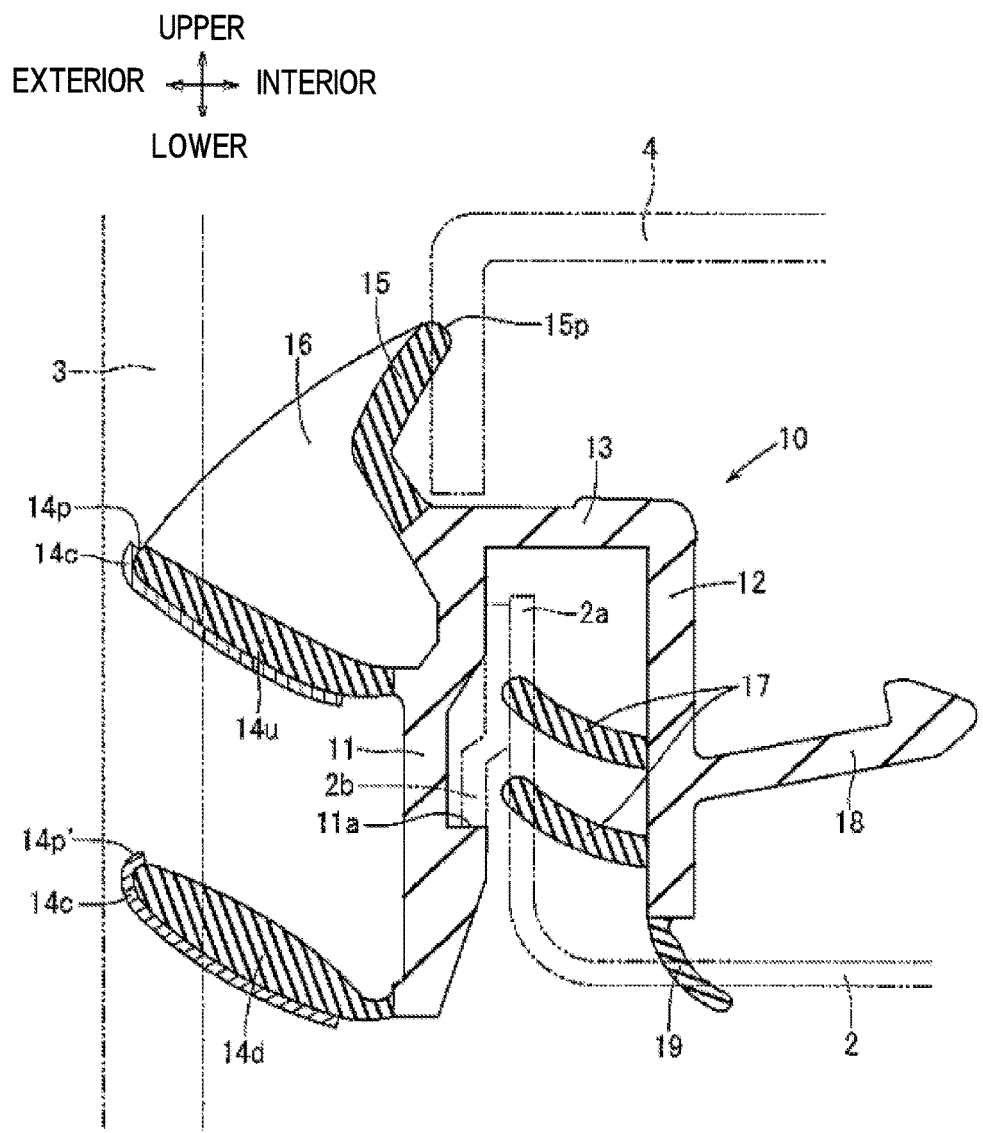
FIG. 4 is a side sectional view of the inner weather strip of the first illustrative embodiment.

As shown in FIGS. 2 to 4, the inner weather strip 10 includes a main body part having an exterior lateral wall 11 and an interior lateral wall 12, which are arranged to face each other with a predetermined interval, and a top wall 13 that integrally connects upper edges of both lateral walls 11, 12. An upper seal lip 14u and a lower seal lip 14d integrally protrude from an outer surface of the exterior lateral wall 11 between both longitudinal direction end portions of the exterior lateral wall 11. Also, a top wall lip 15 integrally protrudes from a part of an outer surface of the top wall 13 which is joined to the exterior lateral wall 11, between both longitudinal direction end portions of the top wall 13. Both longitudinal direction end portions of the inner weather strip 10 are provided with end surface walls 16.

The upper seal lip 14u and the lower seal lip 14d have a substantially flat pleat shape and protrude obliquely upwards from the exterior lateral wall 11, respectively. The lower seal lip 14d is slightly thicker than the upper seal lip 14u and is less inclined relative to a horizontal direction than the upper seal lip 14u (i.e., the lower seal lip is closer to the horizontal). The top wall lip 15 is a pleat shaped member having a V-shaped section by being bent at a central portion in the upper and lower direction and protrudes upwards from the top wall 13. Protruding heights (height positions of tip ends 14p, 14p') of the upper seal lip 14u and the lower seal lip 14d and a protruding height (a height position of a tip end 15p) of the top wall lip 15 from the main body part are substantially uniform between both longitudinal direction end portions, respectively.

Outer surfaces of the upper seal lip 14u and the lower seal lip 14d that contacts the window plate 3 are covered with a low-friction material layer 14c (a layer formed of a material having a coefficient of static friction lower than the material of the seal lip) made of a silicon resin material, a fluorine resin material or pile, or the like. Both longitudinal direction end surfaces of the upper seal lip 14u are joined to the end surface walls 16 at joining parts 16k, and a side edge 16a of the end surface wall 16 is formed to have the same shape as the outer surface of the upper seal lip 14u. The side edge 16a of the end surface wall 16 is not covered with the low-friction material layer 14c, unlike the upper seal lip 14u. The reason is because, since an longitudinal direction end surface of the upper seal lip 14u is integrally formed with the end surface wall 16 by injection molding of a polymer material after being covered with the low-friction material layer 14c, it is not possible to arrange the low-friction material layer 14c on the side edge 16a of the end surface wall 16. For this reason, the side edge 16a of the end surface wall 16 is more difficult to slip than the outer surface of the upper seal lip 14u covered with the low-friction material layer 14c. Upon the up-and-down operation of the window plate 3, when the side edge 16a of the end surface wall 16 is contacted to the window plate 3 like the outer surface of the upper seal lip 14u, an abnormal noise is likely to be generated between the side edge 16a of the end surface wall 16 and the window plate 3. Therefore, the upper seal lip 14u is inclined towards the interior side (top wall lip 15 side) at the joining part 16k with the end surface wall 16. Thereby, since the side edge 16a of the end surface wall 16 not covered with the low-friction material layer 14c is spaced from the window plate 3, it is possible to prevent the abnormal noise when the window plate 3 is moved up and down. In the meantime, the description "inclined towards the interior side (top wall lip 15 side)" means a state where the entire upper seal lip 14u rotates about a root joined to the exterior lateral wall 11 and is displaced towards the interior side.

A pleat shaped retainer lip 17 includes upper and lower lips and integrally protrudes from an inner surface of the interior lateral wall 12 between both longitudinal direction end portions of the interior lateral wall 12. An engaging piece 18 integrally protrudes from an outer surface of the interior lateral wall 12 between both longitudinal direction end portions of the interior lateral wall 12. A pleat shaped shield lip 19 integrally protrudes from a lower edge of the interior lateral wall 12 between both longitudinal direction end portions of the interior lateral wall 12.

The main body part (the exterior lateral wall 11, the interior lateral wall 12 and the top wall 13) and engaging piece 18 of the inner weather strip 10 have predetermined rigidity (for example, 85 to 95 of Durometer Hardness HAD of JIS K 7215), and are made of a slightly elastically deformable material. Specifically, a thermoplastic synthetic resin such as PP, PE, AES or the like, thermoplastic elastomer, rubber or the like can be used. Among them, a semi-rigid or rigid thermoplastic resin is preferably used, and a material based on olefin-based thermoplastic elastomer (TPO) is more preferably used.

In the meantime, since the upper and lower seal lips 14u, 14d, the top wall lip 15, the retainer lip 17 and the shield lip 19 are also integrally formed with the main body part such as the exterior lateral wall 11 by coextrusion, they are basically formed of the same type of material as the main body part. However, since the corresponding parts are elastically contacted to a variety of members, a material that is more flexible and more easily elastically deformable than the main body part is used. Specifically, a material having 60 to 80 of Durometer Hardness HAD of JIS K 7215 is used. For example, a soft or semi-rigid thermoplastic resin or a material based on olefin-based thermoplastic elastomer (TPO) is preferably used.

The inner weather strip 10 is mounted to the upper edge flange 2a of the door inner panel 2 from above so as to cover the same. At this time, a plurality of engaging claws 2b is joined to the upper edge flange 2a with equal intervals in the longitudinal direction by welding or the like, and each of the engaging claws 2b is engaged to a step portion 11a formed in an inner surface of the exterior lateral wall 11 of the inner weather strip 10. At the same time, the retainer lip 17 is elastically contacted to the upper edge flange 2a, so that the inner weather strip 10 is stably kept to the door inner panel 2. The shield lip 19 is also elastically contacted to the door inner panel 2, so that a gap between the interior lateral wall 12 of the inner weather strip 10 and the door inner panel 2 is shielded.

In the meantime, the upper seal lip 14u and the lower seal lip 14d are elastically contacted to the window plate 3. Thereby, a gap between the door inner panel 2 and the window plate 3 is shielded by the inner weather strip 10.

Particularly, since the lower seal lip 14d is thicker than the upper seal lip 14u, an elastic contact pressure with the window plate 3 is higher than the upper seal lip 14u. In the meantime, the outer surfaces of the upper seal lip 14u and the lower seal lip 14d are covered with the low-friction material layer 14c, so that the window plate 3 can smoothly (without generating an abnormal noise) move up and down with elastically contacting the upper seal lip 14u and the lower seal lip 14d.

Also, the top wall lip 15 is elastically contacted to the door trim 4. Thereby, a gap between the window plate and the door trim 4 is shielded by the inner weather strip 10. In the meantime, although not shown, the engaging piece 18 of the inner weather strip 10 is inserted and engaged in an engaging hole of an engaging plate integrally formed downwards from an inner surface of the door trim 4. Thereby, the inner weather strip 10 is stably fixed to the door trim 4.

The end surface wall 16 is formed to have a shape having a predetermined width and length (height) in a planar direction substantially orthogonal to the longitudinal direction of the inner weather strip 10 by injection molding. Specifically, the end surface wall 16 is preferably formed at a terminal of the inner weather strip 10 by press-cutting a longitudinal direction end portion of the inner weather strip 10 which has been formed by the extrusion molding, inserting the longitudinal direction end portion into an injection mold, and performing the injection molding. However, the end surface wall 16 formed in advance by the injection molding may be fitted to the terminal of the inner weather strip 10 formed by the extrusion molding. The end surface wall 16 is formed to include an area surrounded by the upper seal lip 14u, the exterior lateral wall 11 and the top wall lip 15, in a side view, and an upper edge 16b of the end surface wall coincides with a line connecting the tip end 14p of the upper seal lip 14u and the tip end 15p of the top wall lip 15. The upper edge 16b of the end surface wall 16 is formed to have a height equal to or lower than the tip end 15p of the top wall lip 15. Thereby, the end surface wall 16 does not protrude from the tip end 15p of the top wall lip 15 when viewed in the longitudinal direction and provides a sense of unity, so that the outward appearance of the inner weather strip 10 is improved.

The end surface wall 16 is integrally joined to at least a part of the top wall lip 15 at a joining part 16j so as to function as a rib with respect to each of both longitudinal direction end portions of the top wall lip 15 and to improve a shape retaining property of both longitudinal direction end portions of the top wall lip 15. In the first illustrative embodiment, the end surface wall 16 is integrally joined with all of the upper seal lip 14u, the exterior lateral wall 11, and the top wall lip 15 surrounding the end surface wall. Therefore, the end surface wall 16 is formed of the same type of material as the upper seal lip 14u, the exterior lateral wall 11 and the top wall lip 15. Specifically, the end surface wall 16 is preferably formed of a material having the substantially same physical property as the top wall lip 15 and having 60 to 80 of Durometer Hardness HDA of JIS K 7215, but may also be formed to have the hardness lower than the top wall lip 15. As the material to be used, a soft or semi-rigid thermoplastic resin or a material based on olefin-based thermoplastic elastomer (TPO) is preferably used. In the first illustrative embodiment, the end surface wall 16 is configured as a substantially flat wall.

When the inner weather strip 10 is joined to the door inner panel 2, both longitudinal direction end portions thereof are contacted to the glass run channel 5. Specifically, each of the end surface walls 16 joined to both longitudinal direction end portions of the inner weather strip 10 is inclined in a direction in which the upper edge 16b comes closer to the glass run channel than the longitudinal direction terminal of the main body part of the inner weather strip 10, and when the inner weather strip 10 is mounted to the door inner panel 2, the upper edge 16b is contacted to the holding lip 54 provided on the interior lateral wall 52 of the glass run channel 5. Thereby, even when the contact angle between the inner weather strip 10 and the glass run channel 5 and the dimension of the gap between the glass run channel 5 and the inner weather strip 10 are varied due to the dimensional variations, the attachment variations, and the like of the inner weather strip 10 and the glass run channel 5, the inner weather strip 10 is always contacted to the holding lip 54 of the glass run channel 5 at the upper edge 16b, so that a constant contact area is secured. Therefore, it is possible to secure a stable contact state between the inner weather strip 10 and the glass run channel 5, so that it is possible to effectively prevent the gap from being formed between the inner weather strip 10 and the glass run channel 5.

Also, since the end surface wall 16 configured to function as a rib with respect to the top wall lip 15 is joined to the top wall lip 15 at the joining part 16j, the shape retaining property of the top wall lip 15 is also improved at both longitudinal direction end portions. Thereby, when the top wall lip 15 is brought into elastic contact with the door trim 4, it is possible to prevent both longitudinal direction end portions of the top wall lip 15 from being bent towards the root-side. Further, when the top wall lip 15 is elastically contacted to the door trim 4 and is thus bent, the end surface wall 16 is also correspondingly deformed. Then, by a repulsive force of the deformation, the seal pressure of the top wall lip 15 is increased at both longitudinal direction end portions. Thereby, it is possible to effectively prevent a gap from being formed between the inner weather strip 10 and the door trim 4. Also, since the end surface wall 16 is also joined to the upper seal lip 14u at the joining part 16k, the upper seal lip 14u functions as a rib with respect to the end surface wall 16, so that the shape retaining property of the end surface wall 16 is also improved. When the end surface wall 16 is contacted to the holding lip 54 of the glass run channel 5, the seal pressure between the end surface wall 16 and the glass run channel 5 is also improved by the repulsive force of the upper seal lip 14u functioning as a rib.

Second Illustrative Embodiment

Figure 5:
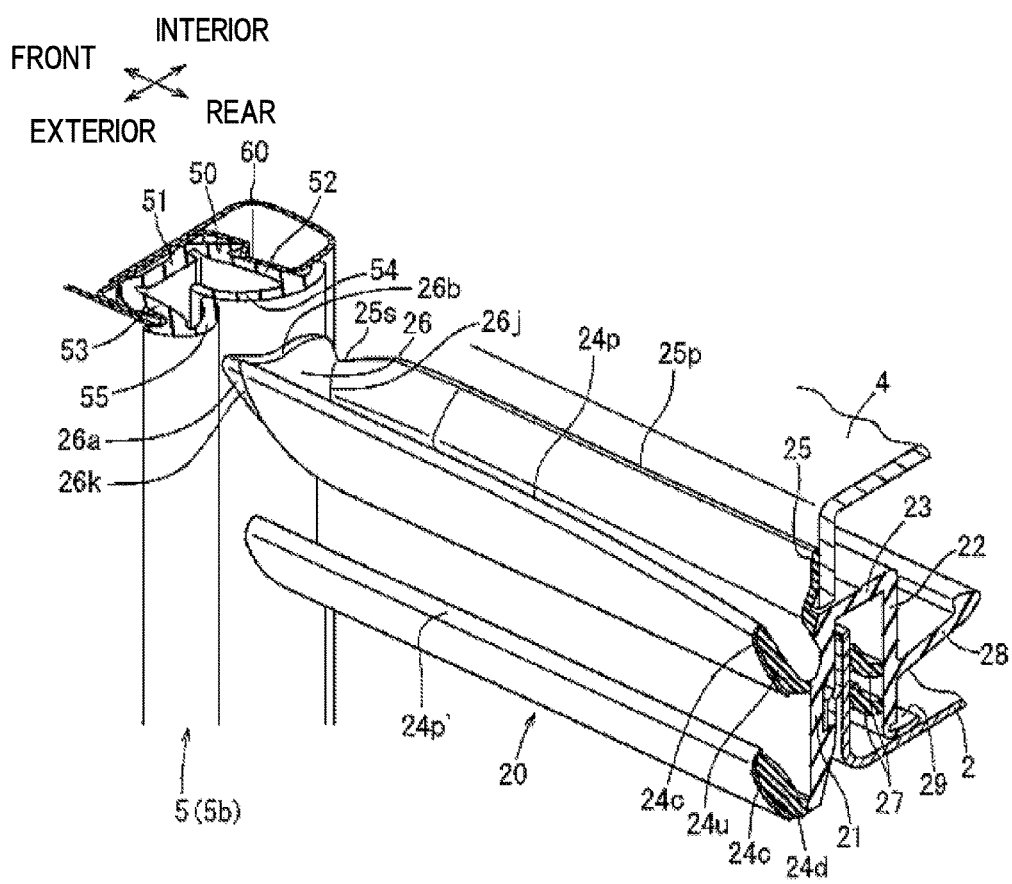
FIG. 5 is a perspective view depicting a contact state between an inner weather strip of a second illustrative embodiment and the glass run channel.
Figure 6:
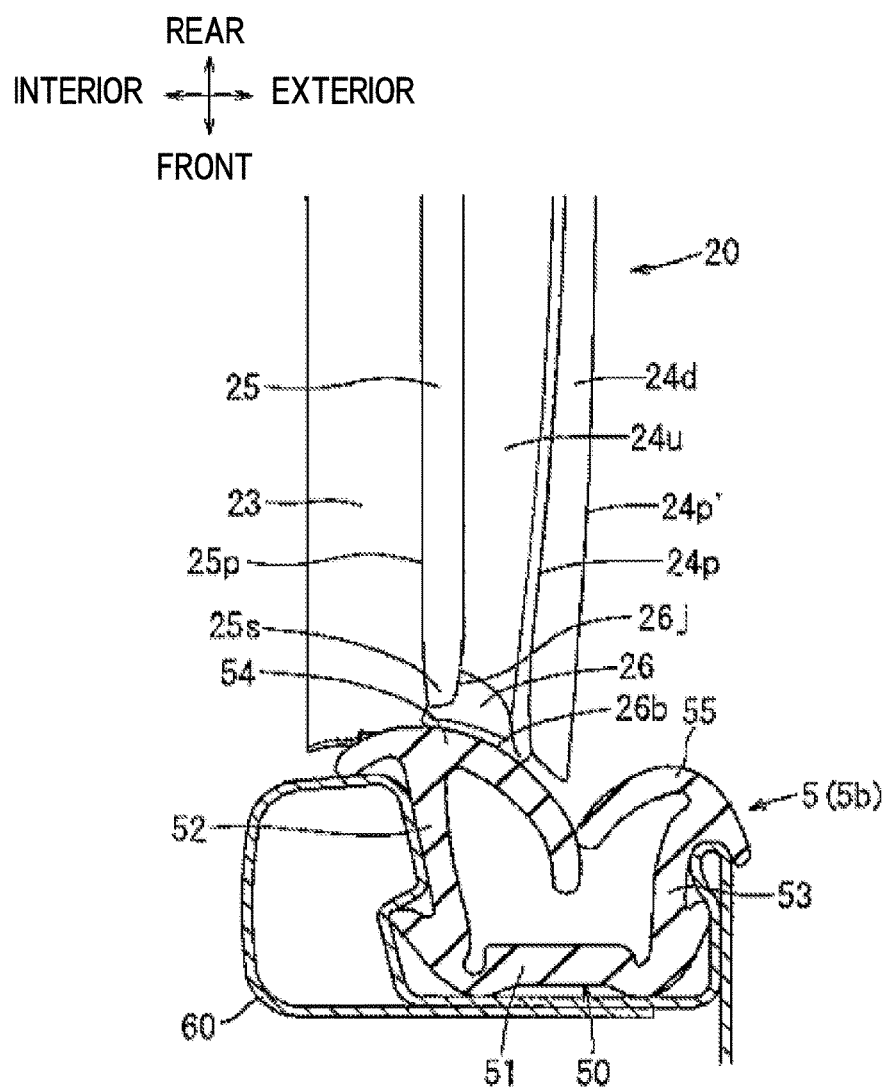
FIG. 6 is a plan view of FIG. 5.
Figure 7:
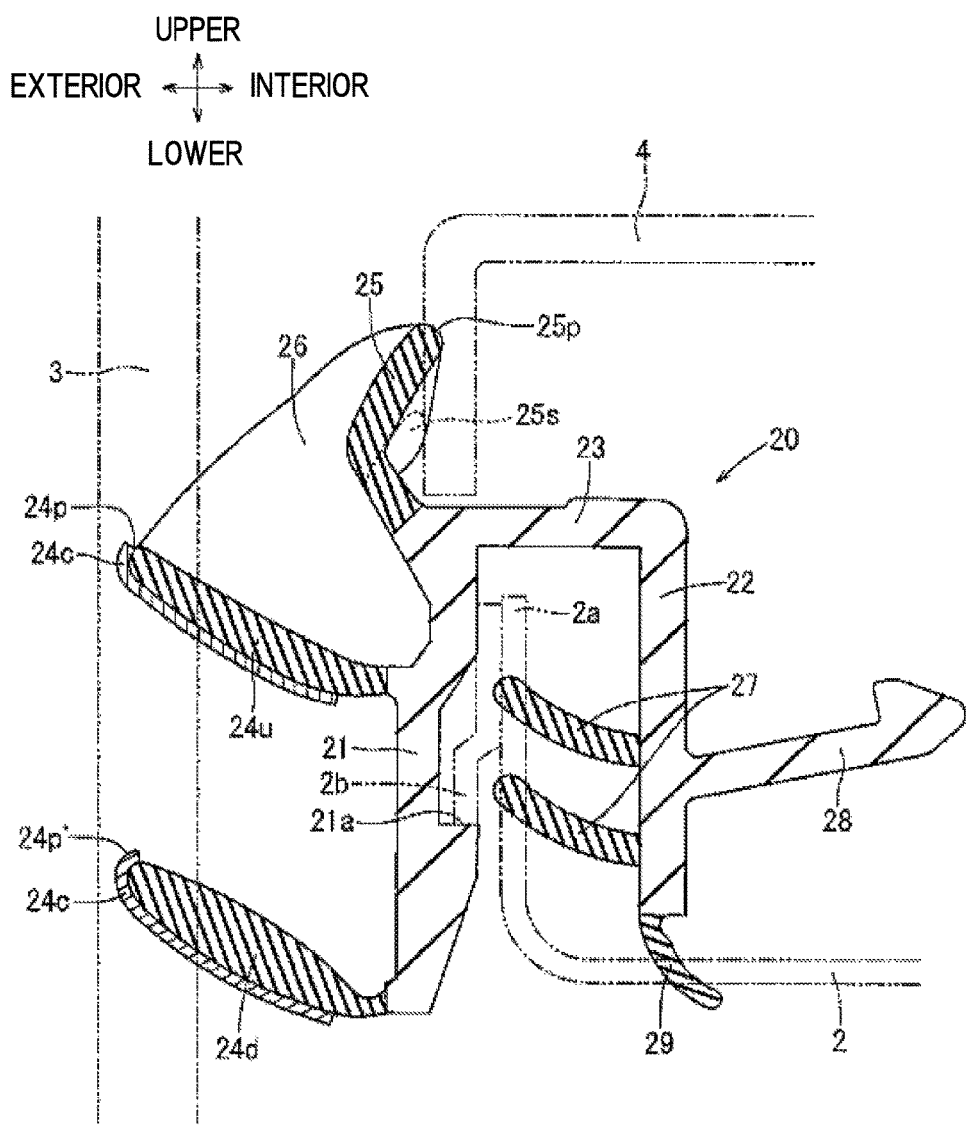
FIG. 7 is a side sectional view of the inner weather strip of the second illustrative embodiment.

FIGS. 5 to 7 depict a second illustrative embodiment of the inner weather strip. An inner weather strip 20 of the second illustrative embodiment is a modified embodiment of the first illustrative embodiment, and is applied to the vehicle door 1, like the inner weather strip 10 of the first illustrative embodiment shown in FIG. 1. Therefore, regarding the door 1, the glass run channel 5 and the like irrelevant to the disclosure, the descriptions of the first illustrative embodiment are quoted, and the same members are denoted with the same or similar reference numerals and descriptions thereof may be omitted. In the inner weather strip 10 of the first illustrative embodiment shown in FIGS. 2 to 4, the respective parts are denoted with the reference numerals 11, 11a, 12, 13, 14c, 14d, 14u, 14p, 14p', 15, 15p, 16, 16a, 16b, 16j, 16k, 17, 18, and 19. In contrast, in the inner weather strip 20 of the second illustrative embodiment shown in FIGS. 5 to 7, the respective parts corresponding to the inner weather strip 10 of the first illustrative embodiment are denoted with similar reference numerals 21, 21a, 22, 23, 24c, 24d, 24u, 24p, 24p', 25, 25p, 26, 26a, 26b, 26j, 26k, 27, 28, and 29.

Also in the second illustrative embodiment, an upper seal lip 24u and a lower seal lip 24d have a substantially flat pleat shape and protrude obliquely upwards from an exterior lateral wall 21, respectively. The lower seal lip 24d is slightly thicker than the upper seal lip 24u, and is less inclined relative to the horizontal direction than the upper seal lip 24u (i.e., the lower seal lip is closer to the horizontal). A top wall lip 25 is a pleat shaped member having a V-shaped section by being bent at a central portion in the upper and lower direction and protrudes upwards from a top wall 23. The protruding heights (height positions of tip ends 24p, 24p') of the upper seal lip 24u and the lower seal lip 24d from the main body part are substantially uniform between both longitudinal direction end portions, respectively. In the meantime, a low end portion 25s of the top wall lip 25 is formed to be lower than the other portion of the top wall lip 25. The other portion (a central portion in the longitudinal direction) of the top wall lip 25 other than the low end portion 25s is substantially uniform as to the protruding height (height position of a tip end 25p) from the main body part.

An end surface wall 26 is formed to have a shape having predetermined width and length (height) in a planar direction substantially orthogonal to the longitudinal direction of the inner weather strip 20. Specifically, the end surface wall 26 is formed at an area surrounded by the upper seal lip 24u, the exterior lateral wall 21 and the top wall lip 25, in a side view. Also, the end surface wall 26 is curved along an outer surface shape of the glass run channel 5, specifically, an outer surface shape of the holding lip 54 provided on the interior lateral wall 52.

In the meantime, an upper edge 26b of the end surface wall 26 is positioned at a height equal to or lower than the tip end 25p having a predetermined height of the top wall lip 25 other than the low end portion 25s. Thereby, like the first illustrative embodiment, the end surface wall 26 does not protrude from the tip end 25p of the top wall lip 25 when viewed in the longitudinal direction, so that the outward appearance of the inner weather strip 20 is improved. A height of the low end portion 25s of the top wall lip 25 gradually decreases from the tip end 25p of the top wall lip 25 towards the end surface wall 26, the low end portion is joined to the end surface wall 26 at a joined part 26j, and a partial region of the end surface wall 26 exists above the joining part 26j. A space surrounded by the partial region of the end surface wall 26 and a tip end of the low end portion 25s is formed above the low end portion 25s. The end surface wall 26 and the low end portion 25s of the second illustrative embodiment are formed by press cutting a longitudinal direction end portion of the inner weather strip 20 which has been formed by the extrusion molding, inserting the longitudinal direction end portion into an injection mold, and performing the injection molding. The method of forming the end surface wall 26 and the low end portion 25s is not limited to the above-described method. For example, a longitudinal direction terminal of the top wall lip 25 of the inner weather strip 20, which has been formed by the extrusion molding, may be press-cut into a shape of the low end portion 25s, and then, the end surface wall 26 formed in advance by the injection molding may be fitted to the terminal of the inner weather strip 20 so as to become integral with the low end portion 25s. The end surface wall 26 is integrally joined with all of the upper seal lip 24u, the exterior lateral wall 21 and the top wall lip 25 surrounding the end surface wall.

When the inner weather strip 20 is mounted to the door inner panel 2, both longitudinal direction end portions thereof are contacted to the glass run channel 5. Specifically, the inner weather strip 20 is contacted to the holding lip 54 provided on the interior lateral wall 52 of the glass run channel 5. At this time, each of the end surface walls 26 positioned at both longitudinal direction end portions of the inner weather strip 20 is curved in conformity to the outer surface shape of the holding lip 54 and is adequately contacted to the holding lip 54 of the glass run channel 5. Thereby, even when the contact angle between the inner weather strip 20 and the glass run channel 5 is changed due to the dimensional variations, the attachment variation, and the like of the inner weather strip and the glass run channel, the end surface wall 26 is also easily deformed in correspondence thereto. Therefore, it is possible to secure the stable contact state between the inner weather strip 20 and the glass run channel 5, so that it is possible to effectively prevent a gap from being generated therebetween.

Also, since the end surface wall 26 and the low end portion 25s of the top wall lip 25 are joined to each other, the shape retaining property of the top wall lip 25 is also improved at the low end portion 25s. Thereby, when the top wall lip 25 is brought into elastic contact with the door trim 4, it is possible to prevent the low end portion 25s of the top wall lip 25 from being bent towards the root-side. Further, since the end surface wall 26 and the top wall lip 25 are joined to each other, when the low end portion 25s of the top wall lip 25 is elastically contacted to the door trim 4 and is thus bent, the end surface wall 26 is also correspondingly deformed. Then, by the repulsive force of the deformation, the seal pressure of the top wall lip 25 is increased at the low end portion 25s. Thereby, it is possible to effectively prevent a gap from being formed between the inner weather strip 20 and the door trim 4. Also, since the end surface wall 26 is also joined to the upper seal lip 24u, the shape retaining property of the upper seal lip 24u and the end surface wall 26 is improved and the seal pressure between the inner weather strip 20 and the glass run channel 5 is also increased.

Also, the low end portion 25s of the top wall lip 25 is formed to be lower than the portion other than the low end portion 25s, and is joined to the end surface wall 26 at the joining part 26j. A partial region of the end surface wall 26 above the joining part 26j is more likely to be deformed than a region at which the top wall lip 25 configured to function as a rib is joined. Thereby, when the inner weather strip 20 is brought into contact with the glass run channel 5, even if the end surface wall 26 is deformed from the initial angle due to the variations of the inner weather strip and the glass run channel, the corresponding deformation is caused only in the partial region of the end surface wall 26 which is above the joining part 26j and easily deforms, and the end surface wall is deformed within a space surrounded by the partial region and the tip end of the low end portion 25s. Therefore, the deformation does not spread to the joining part 26j and does not affect the top wall lip 25, so that the deformation of the top wall lip 25 such as undulations can be avoided. Thereby, the seal between the inner weather strip 20 and the door trim 4 is stabilized.

Third Illustrative Embodiment 3

Figure 8:
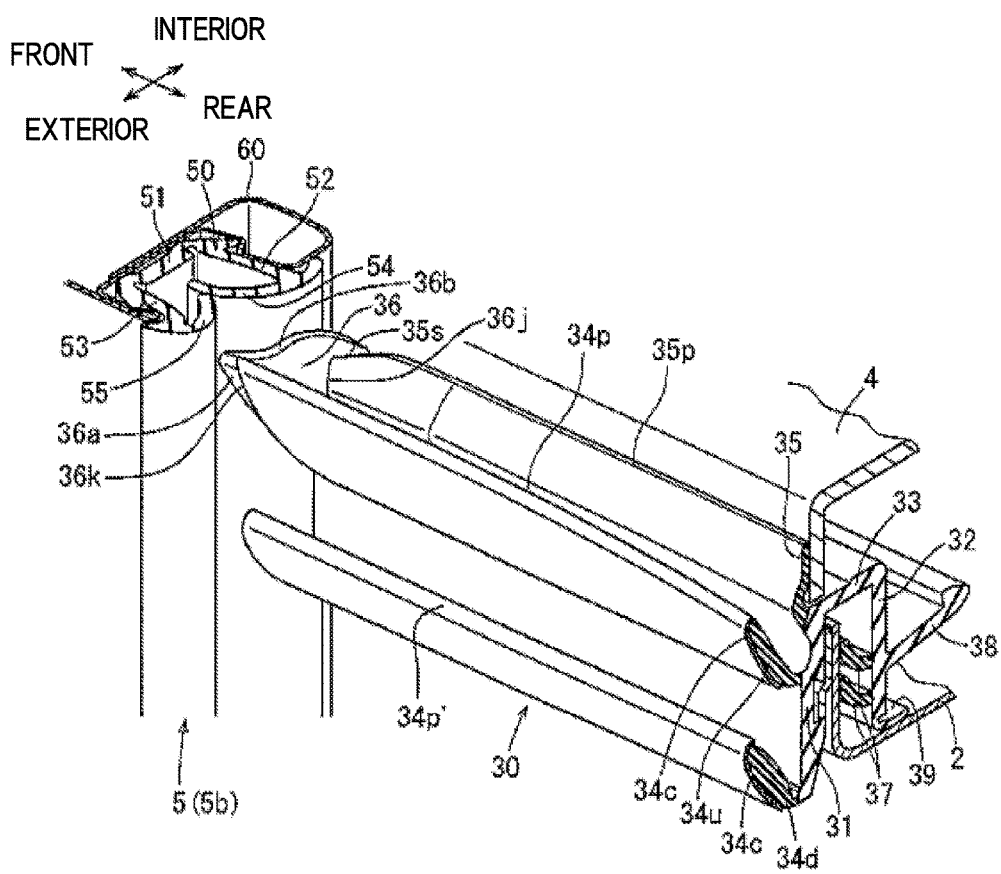
FIG. 8 is a perspective view depicting a contact state between an inner weather strip of a third illustrative embodiment and the glass run channel.
Figure 9:
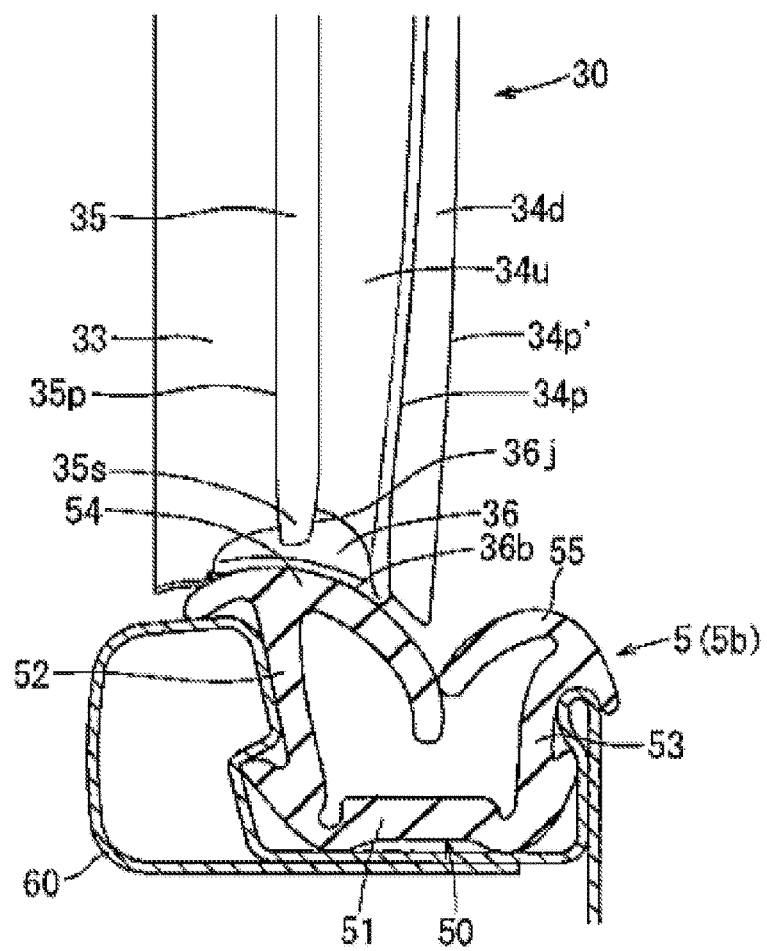
FIG. 9 is a plan view of FIG. 8.
Figure 10:
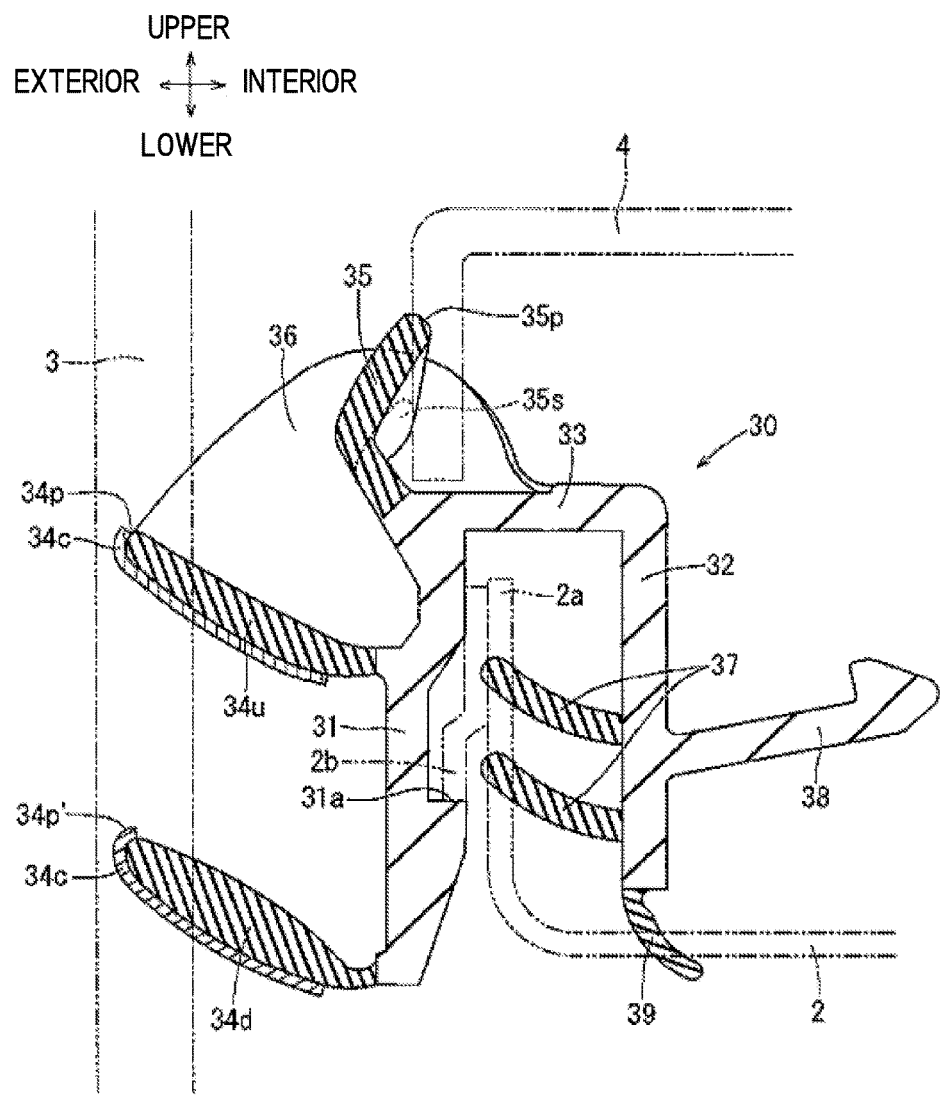
FIG. 10 is a side sectional view of the inner weather strip of the third illustrative embodiment.

FIGS. 8 to 10 depict a third illustrative embodiment of the inner weather strip. An inner weather strip 30 of the third illustrative embodiment is also a modified embodiment of the first illustrative embodiment, and is applied to the vehicle door 1, like the inner weather strip 10 of the first illustrative embodiment shown in FIG. 1. Therefore, regarding the door 1, the glass run channel 5 and the like irrelevant to the disclosure, the descriptions of the first illustrative embodiment are quoted, and the same members are denoted with the same or similar reference numerals and the descriptions thereof may be omitted. In the inner weather strip 10 of the first illustrative embodiment shown in FIGS. 2 to 4, the respective parts are denoted with the reference numerals 11, 11a, 12, 13, 14c, 14d, 14u, 14p, 14p', 15, 15p, 16, 16a, 16b, 16j, 16k, 17, 18, and 19. In contrast, in the inner weather strip 30 of the third illustrative embodiment shown in FIGS. 8 to 10, the respective parts corresponding to the inner weather strip 10 of the first illustrative embodiment are denoted with the similar reference numerals 31, 31a, 32, 33, 34c, 34d, 34u, 34p, 34p', 35, 35p, 36, 36a, 36b, 36j, 36k, 37, 38, and 39.

Also in the third illustrative embodiment, an upper seal lip 34u and a lower seal lip 34d have a substantially flat pleat shape and protrude obliquely upwards from an exterior lateral wall 31, respectively. The lower seal lip 34d is slightly thicker than the upper seal lip 34u, and is less inclined relative to the horizontal direction than the upper seal lip 34u (i.e., the lower seal lip is closer to the horizontal). A top wall lip 35 is a pleat shaped member having a V-shaped section by being bent at a central portion in the upper and lower direction and protrudes upwards from a top wall 33. The protruding heights (height positions of tip ends 34p, 34p') of the upper seal lip 34u and the lower seal lip 34d from the main body part are substantially uniform between both longitudinal direction end portions, respectively. In the meantime, a low end portion 35s of the top wall lip 35 is formed to be lower than the other portion of the top wall lip 35. The other portion of the top wall lip 35 other than the low end portion 35s is substantially uniform as to the protruding height (height position of a tip end 35p) from the main body part.

An end surface wall 36 is formed to have a shape having predetermined width and length (height) in a planar direction substantially orthogonal to the longitudinal direction of the inner weather strip 30. Specifically, the end surface wall 36 extends to the interior side beyond the top wall lip 35, in addition to an area surrounded by the upper seal lip 34u, the exterior lateral wall 31 and the top wall lip 35, in a side view. Specifically, the end surface wall reaches a central portion of the top wall 33 in an axis direction (width direction) beyond the top wall lip 35. Thereby, the end surface wall 36 is larger than the end surface wall 26 of the second illustrative embodiment, so that a contact area with the glass run channel 5 is increased. Also, the end surface wall 36 is curved along the outer surface shape of the glass run channel 5, specifically, the outer surface shape of the holding lip 54 provided on the interior lateral wall 52. As described above, since the contact area with the glass run channel is increased, as compared to the second illustrative embodiment, the sound insulation is further improved.

In the meantime, a partial region of the end surface wall 36 protrudes upwards beyond a joining part 36j at which the end surface wall 36 is joined with the top wall lip 35. However, an upper edge 36b of the end surface wall 36 is positioned at a height equal to or lower than a portion of the top wall lip 35 other than the low end portion 35s. The end surface wall 36 is integrally joined with the upper seal lip 34u, the exterior lateral wall 31, the top wall lip 35 and the top wall 33.

When the inner weather strip 30 is mounted to the door inner panel 2, both longitudinal direction end portions thereof is contacted to the glass run channel 5. Specifically, the inner weather strip 30 is contacted to the holding lip 54 provided on the interior lateral wall 52 of the glass run channel 5. At this time, each of the end surface walls 36 joined to both longitudinal direction end portions of the inner weather strip 30 is curved in conformity to the outer surface shape of the holding lip 54 and is adequately contacted to the holding lip 54 of the glass run channel 5. Thereby, even when the contact angle between the inner weather strip 30 and the glass run channel 5 is changed due to the dimensional variations, the attachment variation, and the like of the inner weather strip and the glass run channel, the end surface wall 36 is also easily deformed in correspondence thereto. Therefore, it is possible to secure the stable contact state between the inner weather strip 30 and the glass run channel 5, so that it is possible to effectively prevent a gap from being generated therebetween.

Also, since the end surface wall 36 and the low end portion 35s of the top wall lip 35 are joined to each other, the shape retaining property of the top wall lip 35 is also improved at the low end portion 35s. Thereby, when the top wall lip 35 is brought into elastic contact with the door trim 4, it is possible to prevent the low end portion 35s of the top wall lip 35 from being bent towards the root-side. Further, since the end surface wall 36 and the low end portion 35s of the top wall lip 35 are joined to each other, when the top wall lip 35 is elastically contacted to the door trim 4 and is thus bent, the end surface wall 36 is also correspondingly deformed. Then, by the repulsive force of the deformation, the seal pressure of the top wall lip 35 is increased at the low end portion 35s. Thereby, it is possible to effectively prevent a gap from being formed between the inner weather strip 30 and the door trim 4. Also, since the end surface wall 36 is also joined to the upper seal lip 34u and the top wall 33, the shape retaining property of the upper seal lip 34u and the end surface wall 36 is also improved and the seal pressure between the inner weather strip 30 and the glass run channel 5 is also increased.

Also, the low end portion 35s of the top wall lip 35 is formed to be lower than the other portion of the top wall lip 35, and is joined to the end surface wall 36 at the joining part 36j. A partial region of the end surface wall 36 above the joining part 36j is more likely to be deformed than a region at which the top wall lip 35 configured to function as a rib is joined. Thereby, when the inner weather strip 30 is brought into contact with the glass run channel 5, even if the end surface wall 36 is deformed from the initial angle due to the variations of the inner weather strip and the glass run channel, the corresponding deformation is caused only in the partial region of the end surface wall 36 which is above the joining part 36j and easily deforms, and the end surface wall is deformed within a space surrounded by the partial region and the tip end of the low end portion 35s. Therefore, the deformation does not spread to the joining part 36j and does not affect the top wall lip 35, so that the deformation of the top wall lip 35 such as undulations can be avoided. Thereby, the seal between the inner weather strip 30 and the door trim 4 is stabilized.

Other Illustrative Embodiments

In the above illustrative embodiments, the inner weather strip including the main body part including the exterior lateral wall, the interior lateral wall and the top wall has been exemplified. However, there is an inner weather strip without the interior lateral wall, i.e., an inner weather strip having the main body part including the exterior lateral wall and the top wall. Also, in the above illustrative embodiments, the inner weather strip having the seal lip including upper and lower lips has been exemplified. However, there is an inner weather strip having only one seal lip. The disclosure can also be applied to these inner weather strips.

In the first illustrative embodiment where the height of the top wall lip 15 (height position of the tip end) is substantially uniform between both longitudinal direction end portions, the end surface wall 16 may be formed to be lower than the top wall lip 15. In this case, since the end surface wall 16 is little noticeable, the appearance of the inner weather strip 10 is improved.

In the first to third illustrative embodiments, the top wall lip is provided on a portion of the outer surface at which the top wall and the exterior lateral wall are joined to each other. However, the position of the top wall lip is not limited thereto and may be provided at any position on the outer surface of the top wall.

Also in the first illustrative embodiment, like the second and third illustrative embodiments, the end surface wall 16 can be curved in conformity to the outer surface shape of the glass run channel 5. To the contrary, also in the second and third illustrative embodiments, the end surface walls 26, 36 may be formed to be substantially flat. Also in the first illustrative embodiment, like the third illustrative embodiment, the end surface wall 16 may extend towards the interior side (top wall 13) beyond the top wall lip 15.

In the first to third illustrative embodiments, the end surface wall is joined to all of the upper seal lip, the exterior lateral wall and the top wall lip (in the third illustrative embodiment, the end surface wall is also joined to the top wall). However, the end surface wall may not be necessarily joined to the upper seal lip or the exterior lateral wall (also the top wall, in the third illustrative embodiment). Also, the end surface wall and the top wall lip may be joined partially at the tip end side, instead of being entirely joined.

In the first to third illustrative embodiments, the upper seal lip may not be necessarily inclined towards the interior side at the joining part with the end surface wall.

In the second and third illustrative embodiments, the low end portion has the shape of which the height gradually decreases from the tip end of the top wall lip other than the low end portion towards the end surface wall. However, the low end portion may also be formed into a rapidly changing shape such as a U-shape or a V-shape. The low end portion is required to form a space for accommodating therein the deformation of the tip end portion of the end surface wall when the end surface wall is contacted to the glass run channel.

Although the representative illustrative embodiments of the disclosure have been described, the disclosure is not limited thereto and a variety of changes can be made without departing from the spirit of the disclosure.

According to an aspect of the disclosure, there is provided a long inner weather strip extending in a longitudinal direction, configured to be mounted to an interior beltline of a vehicle door having a window plate, and having at least one longitudinal direction end portion which is configured to contact with a glass run channel mounted to the vehicle door, the inner weather strip including: a main body part including at least an exterior lateral wall and a top wall integrally connected to an upper edge of the exterior lateral wall; at least one seal lip provided on an outer surface of the exterior lateral wall and configured to elastically contact the window plate; and a top wall lip provided on an outer surface of the top wall and configured to elastically contact a door trim, wherein the main body part, the at least one seal lip, and the top wall lip extends in the longitudinal direction from one longitudinal direction end portion of the inner weather strip to another longitudinal direction end portion of the inner weather strip, wherein the at least one longitudinal direction end portion of the inner weather strip is provided with an end surface wall which extends in a direction intersecting with the longitudinal direction, and wherein the end surface wall has a size equal to or larger than a size of an area surrounded by: an uppermost seal lip among the at least one seal lip; the main body part; the top wall lip; and a line connecting a tip end of the seal lip and a tip end of the top wall lip, and has a joining part at which the end surface wall and at least a part of an longitudinal direction end surface of the top wall lip are integrally joined to each other.

According to this configuration, the end surface wall has a size equal to or larger than a size of an area surrounded from the seal lip provided at the exterior lateral wall to the top wall lip provided at the top wall, and extends in the upper and lower direction which is the same as the direction in which the glass run channel is to be mounted. Therefore, when the inner weather strip and the glass run channel are contacted to each other, the contact area between the inner weather strip of the disclosure and the glass run channel increases, as compared to the inner weather strip of the related art. Thereby, even when a contact angle between the inner weather strip and the glass run channel is changed due to dimensional variations, attachment variations or the like, it is possible to secure a stable contact state between the inner weather strip and the glass run channel. Therefore, it is possible to effectively prevent a gap from being formed between the inner weather strip and the glass run channel, so that the sound insulation with respect to the second route through which the exterior noise is introduced into the vehicle interior is improved.

Also, when the end surface wall is joined to at least a part of the longitudinal direction end surface of the top wall lip, since the end surface wall functions as a rib with respect to the top wall lip, the strength and shape retaining property of the top wall lip are improved at the longitudinal direction end portion. This means that a position of the tip end of the top wall lip is stabilized at the longitudinal direction end portion. Thereby, when the top wall lip is elastically contacted to the door trim, it is possible to prevent the longitudinal direction end portion of the top wall lip from being bent towards a root-side. Further, the end surface wall and the top wall lip are joined, so that when the top wall lip is elastically contacted to the door trim and is thus bent, the end surface wall is also correspondingly deformed. By a repulsive force of the deformation, the seal pressure of the top wall lip is increased at the longitudinal direction end portion. Thereby, it is possible to effectively prevent a gap from being formed between the inner weather strip and the door trim, so that the sound insulation with respect to the third route through which the exterior noise is to be introduced into the vehicle interior is improved.

It is preferable that a height of a highest upper edge of the end surface wall is equal to or lower than a height of a highest tip end of the tip end of the top wall lip. According to this configuration, since the upper edge of the end surface wall does not protrude upwards beyond the top wall lip and is not noticeable, the appearance is improved.

It is preferable that the top wall lip has a low end portion joined to the end surface wall at the joining part, a height of the tip end of the top wall lip at the low end portion being lower than a height of the tip end of the top wall lip other than the low end portion, and a partial region of the end surface wall being located above the joining part. In this case, a space surrounded by the partial region of the end surface wall and the tip end of the low end portion is formed above the tip end of the low end portion. The region of the end surface wall above the joining part can be freely deformed and is deformed within the space. Therefore, when the inner weather strip is brought into contact with the glass run channel, even if the end surface wall is deformed from an initial angle in association with the variations of the inner weather strip and the glass run channel, the deformation does not affect the top wall lip, so that the deformation of the top wall lip such as undulations is not caused. Thereby, the seal between the inner weather strip and the door trim is stabilized.

It is preferable that the end surface wall is inclined in a direction in which an upper edge of the end surface wall comes close to the glass run channel. Thereby, even when the contact angle between the inner weather strip and the glass run channel and the dimension of the gap between the glass run channel and the inner weather strip are varied due to the dimensional variations, the attachment variations, and the like of the inner weather strip and the glass run channel, since at least the upper edge of the end surface wall is contacted to the holding lip of the glass run channel, it is possible to secure the stable contact state between the inner weather strip and the glass run channel. Thereby, it is possible to effectively prevent the gap from being formed between the inner weather strip and the glass run channel.

Further, it is preferable that the end surface wall is curved in conformity to an outer surface shape of the glass run channel. According to this configuration, the end surface wall is easily fitted to the glass run channel, so that the sound insulation is further improved.

It is preferable that the end surface wall extends towards an interior side beyond the top wall lip. According to this configuration, since the area of the end surface wall and the contact area with the glass run channel increase, the sound insulation is further improved.

It is preferable that the end surface wall is also integrally joined to a longitudinal direction end surface of the at least one seal lip at a joining part, and the at least one seal lip is inclined towards an interior side at the joining part with the end surface wall. When the end surface wall and the seal lip are joined, since the end surface wall is more difficult to slip than the seal lip, if the end surface wall is contacted to the window plate together with the seal lip, an abnormal noise is likely to be generated between the end surface wall and the window plate. Therefore, by inclining the seal lip towards the interior side at the joining part, a gap is formed between the end surface wall and the window plate, so that it is possible to avoid the contact of the end surface wall with the window plate. Thereby, in the inner weather strip having the end surface wall, when the window plate is caused to move up and down, it is possible to prevent the abnormal noise from being generated at the longitudinal direction end portion of the inner weather strip.

According to another aspect of the disclosure, there is provided a seal structure of a vehicle door in which the above-described inner weather strip is mounted to the interior beltline of the vehicle door, the glass run channel is mounted in an upper and lower direction along an up-and-down locus of both side edges of the window plate so as to guide an up-and-down operation of the window plate, and the at least one longitudinal direction end portion of the inner weather strip is in contact with the glass run channel.

According to the inner weather strip and the seal structure of a vehicle door of the aspects of the disclosure, when the inner weather strip is mounted to the beltline of the vehicle door, the gap is difficult to be formed between the inner weather strip and the glass run channel and between the inner weather strip and the door trim. Thereby, it is possible to effectively prevent the exterior noise introduced into the door from being introduced into the vehicle interior.

What is claimed is:

1. An inner weather strip extending in a longitudinal direction, the inner weather strip being configured to be mounted to an interior beltline of a vehicle door having a window plate, and the inner weather strip having a first longitudinal direction end portion and a second longitudinal direction end portion which are configured to contact with a glass run channel mounted to the vehicle door, the inner weather strip comprising:
a main body part including an exterior lateral wall and a top wall integrally connected to an upper edge of the exterior lateral wall;
a first seal lip provided on an outer surface of the exterior lateral wall, the at least one seal lip being configured to elastically contact the window plate; and
a top wall lip provided on an outer surface of the top wall, the top wall lip being configured to elastically contact a door trim of the vehicle door, wherein:
the main body part, the first seal lip, and the top wall lip extend in the longitudinal direction from the first longitudinal direction end portion of the inner weather strip to the second longitudinal direction end portion of the inner weather strip,
at least one of the first longitudinal direction end portion and the second longitudinal direction end portion is provided with an end surface wall which extends in a transverse direction intersecting with the longitudinal direction, and
the end surface wall has a size equal to or larger than a size of an area bounded by: the first seal lip, the main body part, the top wall lip, and an inclined line connecting between an upper tip end of the first seal lip and an upper tip end of the top wall lip, where a height of the upper tip end of the first seal lip is different than a height of the upper tip end of the top wall lip at the end surface wall, the end surface wall including a first joining part at which the end surface wall and at least a part of a longitudinal direction end surface of the top wall lip are integrally joined to each other.

2. The inner weather strip according to claim 1, wherein a height of a highest upper edge of the end surface wall is equal to or lower than a height of a highest tip end of the upper tip end of the top wall lip.

3. The inner weather strip according to claim 2, wherein the top wall lip has a low end portion joined to the end surface wall at the first joining part, a height of the upper tip end of the top wall lip at the low end portion being lower than a height of the upper tip end of the top wall lip at locations other than the low end portion, and a partial region of the end surface wall being located above the first joining part.

4. The inner weather strip according to claim 1, wherein the end surface wall is inclined in a direction in which an upper edge of the end surface wall converges towards the glass run channel.

5. The inner weather strip according to claim 1, wherein the end surface wall is curved in conformity to an outer surface shape of the glass run channel.

6. The inner weather strip according to claim 1, wherein the end surface wall extends towards an interior side of the vehicle door beyond the top wall lip.

7. The inner weather strip according to claim 1, wherein:
the end surface wall is also integrally joined to a longitudinal direction end surface of the first seal lip at a second joining part; and
the first seal lip is inclined towards an interior side of the vehicle door at the second joining part with the end surface wall.

8. A seal structure of the vehicle door in which the inner weather strip according to claim 1 is mounted to the interior beltline of the vehicle door, the glass run channel is mounted in an upper and lower direction along an up-and-down locus of both side edges of the window plate so as to guide an up-and-down operation of the window plate, and at least one of the first longitudinal direction end portion and the second longitudinal direction end portion of the inner weather strip is in contact with the glass run channel.

9. The inner weather strip according to claim 1, further comprising a plurality of seal lips located on the outer surface of the exterior lateral wall, the plurality of seal lips including the first seal lip and at least one second seal lip, the at least one second seal lip being located below the first seal lip, the first seal lip being an uppermost lip of the plurality of seal lips.

10. The inner weather strip according to claim 1, wherein a second end of the first seal lip converges closer to the top wall lip in the transverse direction as the first seal lip extends from the first longitudinal direction end portion to the second longitudinal direction end portion of the inner weather strip.

11. An inner weather strip extending in a longitudinal direction, the inner weather strip being configured to be mounted to an interior beltline of a vehicle door having a window plate, and the inner weather strip having a first longitudinal direction end portion and a second longitudinal direction end portion which are configured to contact with a glass run channel mounted to the vehicle door, the inner weather strip comprising:
a main body part including an exterior lateral wall and a top wall integrally connected to an upper edge of the exterior lateral wall;
a plurality of seal lips provided on an outer surface of the exterior lateral wall, the plurality of seal lips being configured to elastically contact the window plate, an upper seal lip of the plurality of seal lips being located above the remaining seal lips of the plurality of seal lips on the outer surface of the exterior lateral wall; and
a top wall lip provided on an outer surface of the top wall, the top wall lip being configured to elastically contact a door trim of the vehicle door, wherein:
the main body part, the plurality of seal lips, and the top wall lip extend in the longitudinal direction from the first longitudinal direction end portion of the inner weather strip to the second longitudinal direction end portion of the inner weather strip,
at least one of the first longitudinal direction end portion and the second longitudinal direction end portion is provided with an end surface wall which extends in a transverse direction intersecting with the longitudinal direction, and
the end surface wall has a size equal to or larger than a size of an area bounded by: the upper seal lip, the main body part, the top wall lip, and an inclined line connecting between an upper tip end of the upper seal lip and an upper tip end of the top wall lip, where a height of the upper tip end of the upper seal lip is different than a height of the upper tip end of the top wall lip at the end surface wall, the end surface wall including a joining part at which the end surface wall and at least a part of a longitudinal direction end surface of the top wall lip are integrally joined to each other.

* * * * *